No. 712,837. Patented Nov. 4, 1902.
J. A. MULLEN & E. J. POPE.
MACHINE FOR TREATING PAPER STOCK.
(Application filed Jan. 14, 1902.)
(No Model.) 3 Sheets—Sheet 1.

Witnesses
Edwin B. H. Fowler, Jr.
Edgar B. McBath.

Inventors
Edward J. Pope
and James A. Mullen
by Edson Bro's,
Attorneys

No. 712,837. Patented Nov. 4, 1902.
J. A. MULLEN & E. J. POPE.
MACHINE FOR TREATING PAPER STOCK.
(Application filed Jan. 14, 1902.)

(No Model.)  3 Sheets—Sheet 2.

Witnesses
Edwin B. H. Tower, Jr.
Edgar B. McBath

Inventors
Edward J. Pope
and James A. Mullen
By: Edson Bros.
Attorneys

No. 712,837. Patented Nov. 4, 1902.
J. A. MULLEN & E. J. POPE.
MACHINE FOR TREATING PAPER STOCK.
(Application filed Jan. 14, 1902.)

(No Model.) 3 Sheets—Sheet 3.

Witnesses
Inventors:
Edward J. Pope
James A. Mullen
by Edson Bros.,
Attorneys

UNITED STATES PATENT OFFICE.

JAMES A. MULLEN AND EDWARD J. POPE, OF HOLYOKE, MASSACHUSETTS.

MACHINE FOR TREATING PAPER-STOCK.

SPECIFICATION forming part of Letters Patent No. 712,837, dated November 4, 1902.

Application filed January 14, 1902. Serial No. 89,770. (No model.)

*To all whom it may concern:*

Be it known that we, JAMES A. MULLEN and EDWARD J. POPE, citizens of the United States, residing at Holyoke, in the county of Hampden and State of Massachusetts, have invented certain new and useful Improvements in Machines for Treating Paper-Stock; and we do hereby declare the following to be a full, clear, and exact description of the invention, such as will enable others skilled in the art to which it appertains to make and use the same.

Our invention relates to certain improvements in what may be termed "machines for grinding pulp," otherwise called "beating-engines for paper-stock."

It has for its object, among other things, to effectively disintegrate the stock or material, to increase the beating capacity, to promote the circulation of the material to be operated on or treated, to economize power for driving the beater or engine, and otherwise improve the utility and simplify the construction of the engine.

It consists of the combination and arrangement of parts, including their construction, substantially as hereinafter more fully disclosed, and specifically pointed out by the claim.

Figure 1:
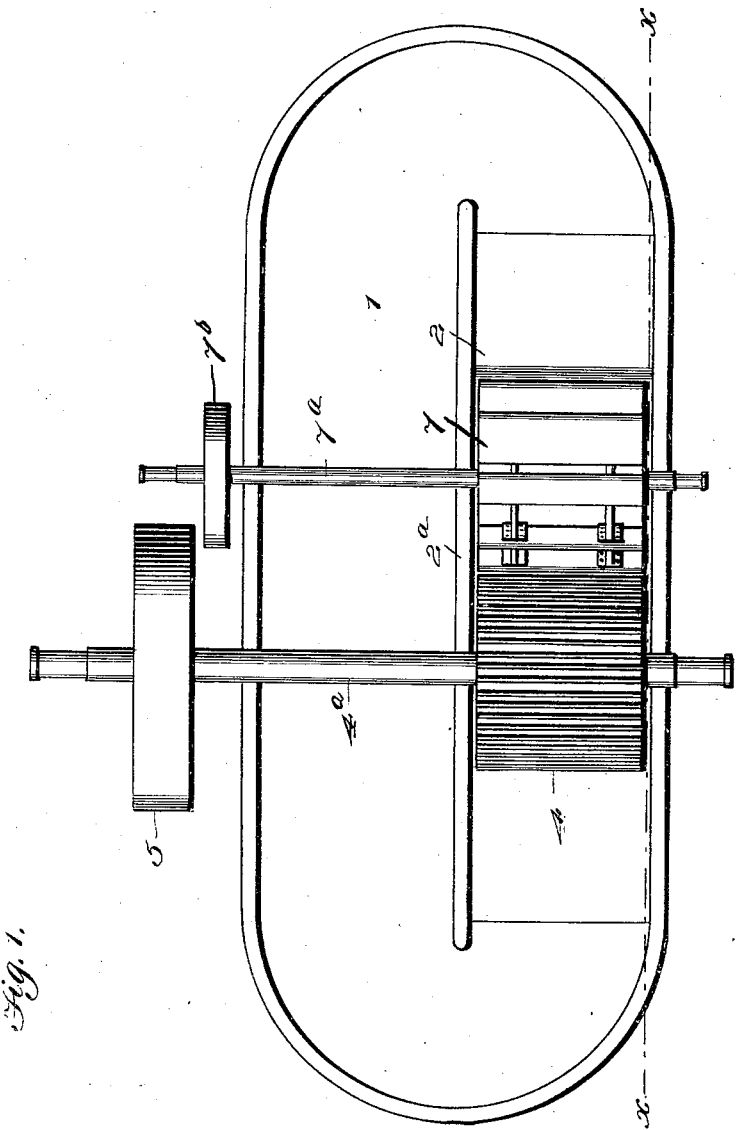
Figure 2:
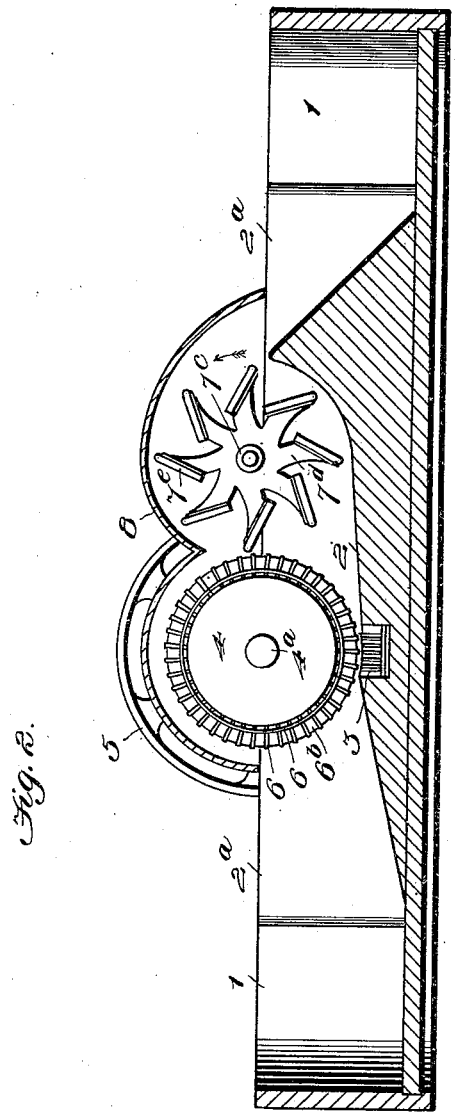
Figure 3:
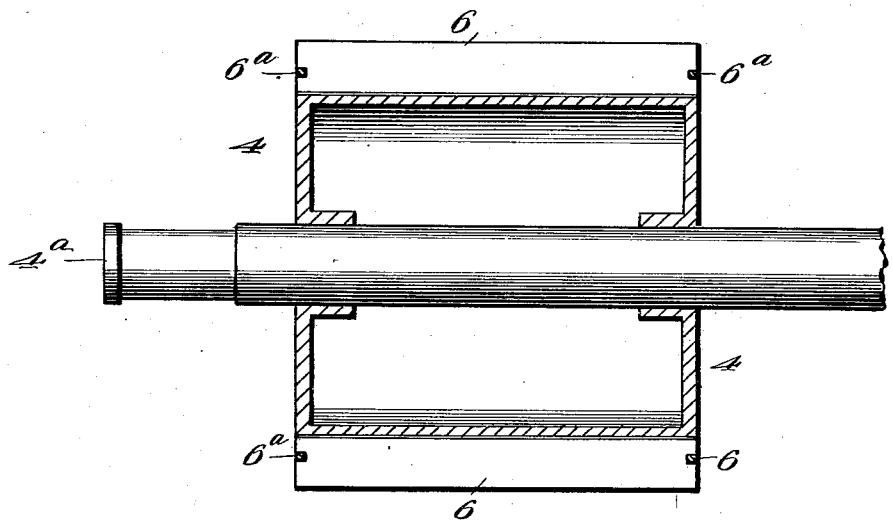
Figure 4:
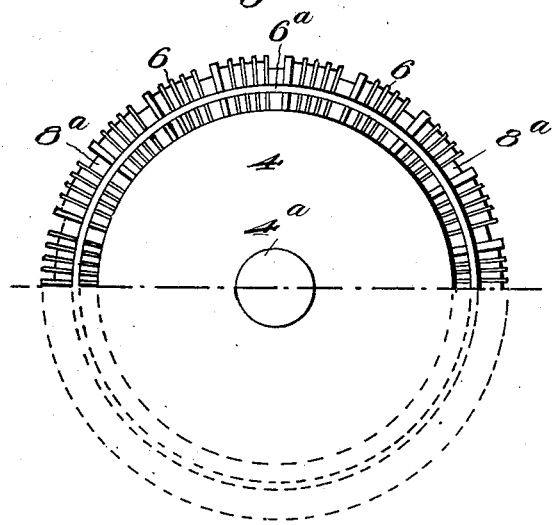

In the accompanying drawings, illustrating the preferred embodiment of our invention, Figure 1 is a plan view. Fig. 2 is a longitudinal section taken on the line $x\ x$ of Fig. 1. Fig. 3 is a longitudinal section of the beater or engine. Fig. 4 is a view showing a modification of the beater or engine.

Latitude is allowed herein as to details, as they may be changed without departing from the spirit of our invention and the same yet remain intact and be protected.

In carrying out our invention we provide, as usual, a suitable receptacle 1, sometimes called the "tub," preferably oblong, with "rounded" or arcual ends. Within said receptacle or tub is provided what is termed the "backfall" 2, occupying in cross-section about a half of the plan cross-sectional area of said receptacle and extending longitudinally parallel with the rectilinear lateral portion of said receptacle, said backfall having its maximum altitude near the rear of said receptacle and sloping or inclining therefrom gradually downwardly to and vanishing at a point near the forward end of said receptacle. Said backfall 2 is laterally divided off or separated from the other portion of the chamber or interior of said receptacle or tub 1 by means of a vertical or upright partition $2^a$, terminating at its ends at about points alining the corresponding portions of the backfall. A suitably constructed or provided bed piece or "plate" 3 is let into the forwardly-extended portion of the backfall 2, extending transversely of the last named its entire width.

Directly above or over the bed piece or plate 3 is arranged the beater or engine 4, having its central shaft $4^a$ suitably journaled or hung in position, and having one end projecting laterally beyond said receptacle, said projecting end portion having secured thereon a driving or power pulley 5. Said beater or engine is cylindrical and armed or equipped with numerous "fly-bars" 6, preferably edgewise-disposed steel or metal bars arranged at close intervals apart, with their inner ends firmly secured upon the periphery of the beater or cylinder in any known or suitable way. Said fly-bars have secured thereto circular lateral members or rings $6^a$ to retain them against lateral displacement. In between said fly-bars are inserted wedges or "blocks" $6^b$, stopping inwardly from the plane touching the outer ends of said fly-bars to effectively engage or act upon the paper stock or material interposed therebetween, and the bed piece or plates 3 in disintegrating or comminuting the same for its reduction into pulp. Said blocks or wedges solidly wedge said fly-bars in place, and thus reinforce them against premature endwise displacement and wear, as well as impart thereto the maximum efficiency. Said fly-bars are in practice of an equal stoutness or thickness throughout their lengths, thus obviating the lessening of their efficiency or strength as they wear away, as would otherwise be the case, especially if tapering or feathering.

Just in rear of the beater or engine 4 is arranged what we term a "propeller" or reel 7, with its shaft $7^a$ suitably journaled or supported in place and equipped with a pulley $7^b$, suitably driven for the rotation or actuation of said propeller, the plane of movement or rotation of the last named being indicated by the arrow. Said reel or propeller has preferably a tubular or hub portion $7^c$, through which passes and is tightly fitted a shaft, and has a series of integral radial arms $7^d$, provided or equipped at their outer ends with preferably-integral broad plate-like portions or "paddles" $7^e$. These paddles as the beater is actuated are adapted to engage and carry the stuff or material treated by the beater or engine rearwardly away from said beater and up the backfall 2, it thence falling over the last named, thus aiding the circulation or carrying of the stuff or material to and for treatment by the beater or engine, said stuff being moved or passed around through the receptacle or tub 1 from end to end between the beater or engine and the bed-plate for effectual treatment. Said beater and propeller are inclosed above the receptacle by a housing 8, having preferably a double arcual upper surface, as shown, suitably secured to said receptacle.

In the modification, as disclosed in Fig. 4, we may arrange the fly-bars in groups, with said groups spaced apart or separated by relatively thick portions or blocks $8^a$, touching the periphery of the beater or cylinder 4 at their inner ends, and their outer ends arranged inwardly some distance from the circle or plane bounding the outer ends of said fly-bars. This arrangement permits the increased circulation of the stuff or material around the fly-bars and through the receptacle, &c.

Having thus described our invention, what we claim as new, and desire to secure by Letters Patent, is—

In apparatus of the character described, the combination of a containing-receptacle having a suitable "backfall" with the "bed" let into the forward extension thereof, a beater or engine suitably hung in said receptacle above said "bed," and a propeller arranged between said beater or engine and the summit of said "backfall," adapted to take the paper-stock from said beater and raise it to and force it over the apex of said "backfall," substantially as set forth.

In testimony whereof we affix our signatures in presence of two witnesses.

JAMES A. MULLEN.
EDWARD J. POPE.

Witnesses:
EDWIN L. MUNN,
GEO. W. PARKER.